(12) United States Patent
Khafagy et al.

(10) Patent No.: US 6,172,342 B1
(45) Date of Patent: Jan. 9, 2001

(54) STEERING WHEEL HEATING SYSTEM

(75) Inventors: Hafiz S Khafagy, Rochester; Ronald Helmut Haag, Clarkston, both of MI (US)

(73) Assignee: Delphi Technologies, Inc., Troy, MI (US)

(*) Notice: Under 35 U.S.C. 154(b), the term of this patent shall be extended for 0 days.

(21) Appl. No.: 09/396,294

(22) Filed: Sep. 15, 1999

(51) Int. Cl.[7] ........................................ H05B 1/02
(52) U.S. Cl. .................. 219/497; 219/501; 219/202; 74/558; 340/309.15; 340/825.72
(58) Field of Search ..................... 219/497, 202, 219/204, 203, 499, 492, 501, 506; 74/552, 557.558; 340/309.15, 825.69, 425.5, 825.72

(56) References Cited

U.S. PATENT DOCUMENTS

| 4,350,287 | * | 9/1982 | Richards | 219/203 |
| 4,549,069 | * | 10/1985 | Oge | 219/204 |
| 4,631,976 | * | 12/1986 | Noda et al. | 219/204 |
| 4,831,514 | * | 5/1989 | Hilpert et al. | 340/309.15 |
| 5,294,775 | * | 3/1994 | Carrier | 219/204 |
| 5,781,695 | * | 7/1998 | Summers et al. | 219/202 |

* cited by examiner

Primary Examiner—Mark Paschall
(74) Attorney, Agent, or Firm—Kathryn A. Marra

(57) ABSTRACT

A steering wheel heating system (10) includes a modular controller (18) electrically connected to a heating element (12) and temperature sensor (20) disposed beneath the surface of a rim portion (14) of a steering wheel (16). Controller (18) includes a cabin temperature sensor (26), a remote control receiver (30), a temperature adjustment control (34), and an on/off/reset switch (36). Steering wheel heating system (10) receives electric current from power system (42) and allows this current to pass through heating element (12) to heat steering wheel (16). Controller (18) controls the flow of current to heating element (12) using control inputs from one or more of steering wheel temperature sensor (20), cabin temperature sensor (26), temperature adjustment control (34), and vehicle climate control system (44). A timing module automatically shuts off the flow of current after a predetermined period of time. Flow of electrical current to heating element (12) can be initiated by remote control receiver (72) or on/off/reset switch (50).

21 Claims, 2 Drawing Sheets

STEERING WHEEL HEATING SYSTEM

SUMMARY OF THE INVENTION

In an exemplary embodiment of the invention, a steering wheel heating system includes a heating element disposed on a portion of a steering wheel and arranged to receive an electrical current. A sensor is disposed on the steering wheel for generating a signal indicative of the temperature on the steering wheel. A controller is arranged to receive the signal from the sensor, as well as a signal input by the user. Controller controls the electrical current such that said electrical current is proportional to the difference between the user-input value and the steering wheel temperature.

BRIEF DESCRIPTION OF THE DRAWINGS

The present invention will now be described, by way of example only, with reference to the accompanying drawings in which.

DETAILED DESCRIPTION OF THE INVENTION

Figure 1:
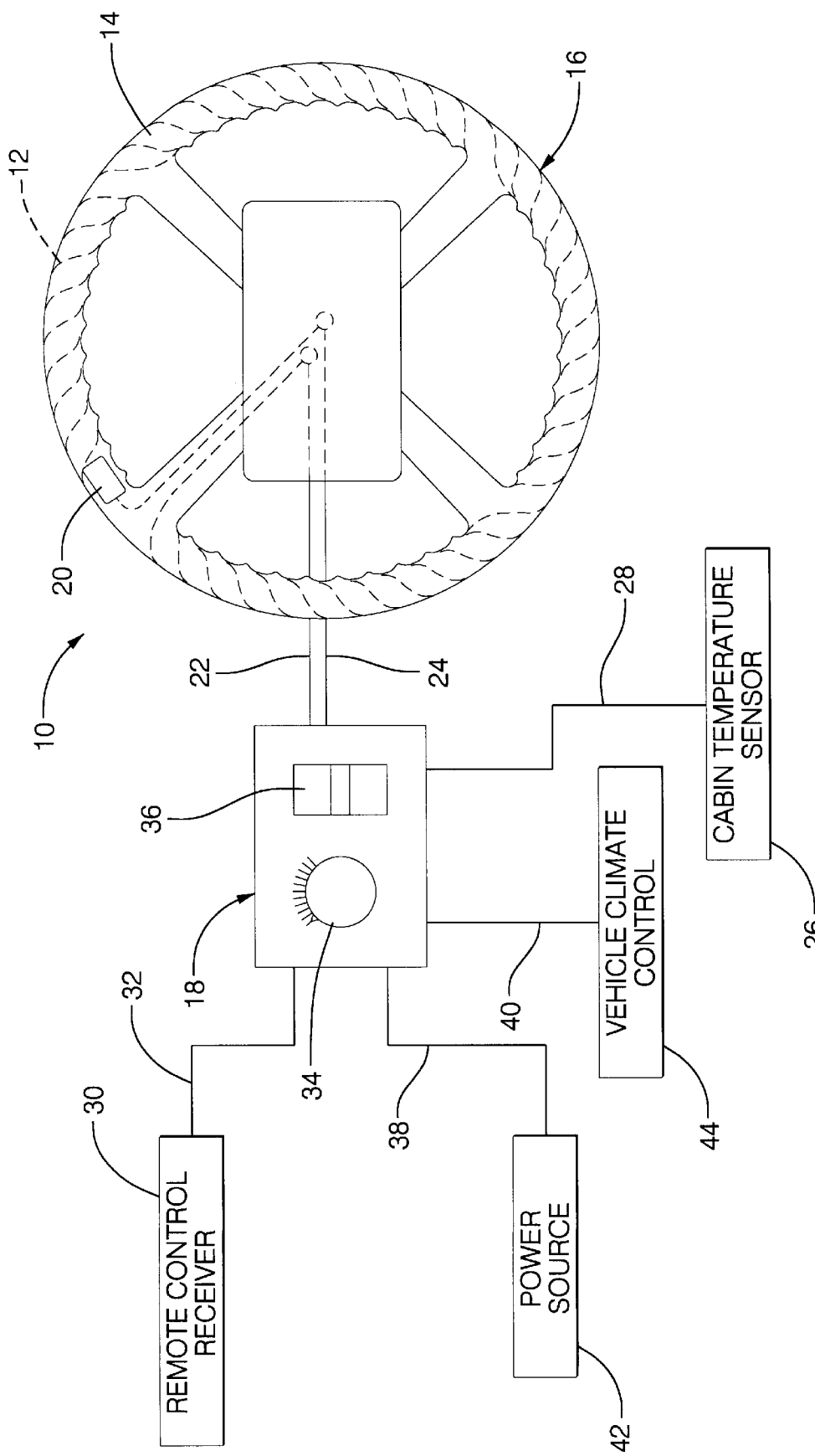
FIG. 1 is a schematic diagram showing a steering wheel heating system of the present invention.

Referring to FIG. 1, a schematic diagram of a steering wheel heating system 10 is shown. Steering wheel heating system 10 includes a heating element 12 and a temperature sensor 20 disposed beneath the surface of a rim portion 14 of a steering wheel 16. Steering wheel heating system 10 further includes a modular controller 18 electrically connected to heating element 12 and temperature sensor 20 via wires 22 and 24, respectively. Controller 18 is mounted, for example, in the dashboard of an automobile (not shown). Controller 18 includes a cabin temperature sensor 26 electrically connected thereto by wire 28, and a remote control receiver 30 electrically connected thereto by wire 32. A temperature adjustment control 34 and an on/off/reset switch 36 extend from controller 18. Wires 38 and 40 extend from controller 18 for electrically connecting steering wheel heating system 10 to electrical power system 42 and a vehicle climate control system 44, respectively.

Steering wheel heating system 10 receives electric current from power system 42 and allows this current to pass through heating element 12 to heat steering wheel 16. Controller 18 controls the flow of current to heating element 12 using control inputs from one or more of steering wheel temperature sensor 20, cabin temperature sensor 26, temperature adjustment control 34, and vehicle climate control system 44. Operation of the steering wheel heating system can be initiated by remote control receiver 30 or on/off/reset switch 36. Operation of controller 18 is described in further detail hereinafter.

Figure 2:
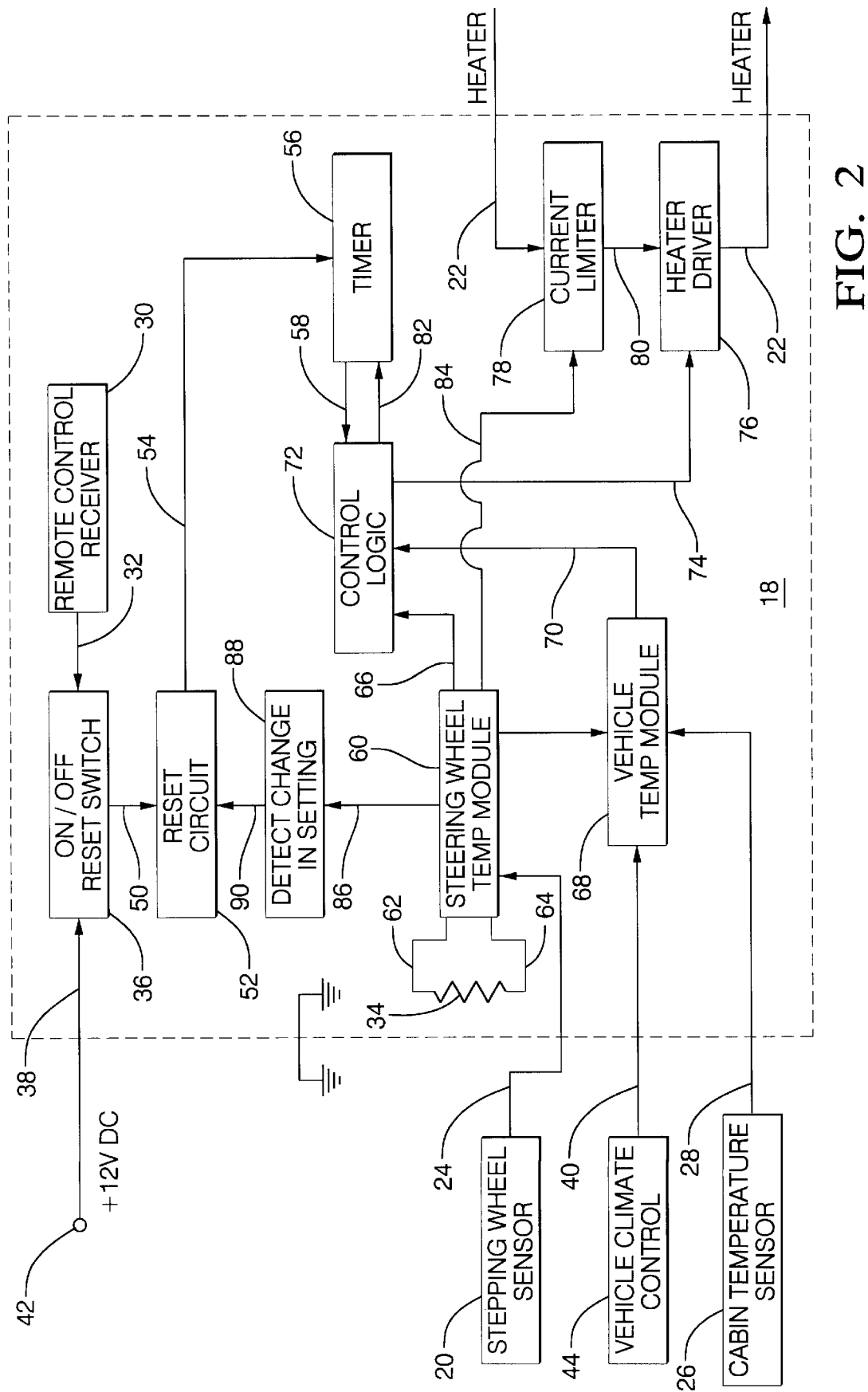
FIG. 2 is a block diagram of the modular controller of FIG. 1.

Referring to FIG. 2, a block diagram of modular controller 18 is shown. Vehicle power is supplied via a line 38 to on/off/reset switch 36. On/off/reset switch 36 is a user accessible actuator for the operator to manually turn on or off said heated steering wheel controller 18. When placed in the on position, said on/off/reset switch 36 generates a first signal on a line 50 connected to a reset circuit 52 which then generates a reset signal to a module timer 56 via a line 54 whereby an output of said timer 56 is driven to a logic high voltage on a line 58.

Temperature adjustment control 34 is connected to a steering wheel temperature module 60 by lines 62 and 64, allowing an operator to adjust a temperature threshold value within module 60. Steering wheel temperature module 60 is also connected to steering wheel sensor 20 via line 24. Steering wheel sensor 20 provides module 60 with a signal indicative of the temperature of the steering wheel. Steering wheel temperature module 60 compares the temperature threshold value to the steering wheel temperature, and generates a steering wheel temperature signal on a line 66 when the steering wheel temperature is below the temperature threshold value. For example, a logic high level signal is generated on line 66 when the wheel temperature is below the temperature threshold value.

The vehicle climate controller 44 and the cabin temperature sensor 26 each supply a signal to a vehicle temperature module 68 via lines 40 and 26, respectively. Cabin temperature sensor 26 provides a signal indicative of a the ambient temperature in the automobile's cabin (interior). Vehicle climate control system 44 provides a signal indicative of a user-adjustable cabin temperature setting. Vehicle temperature module 68 compares the values indicated by the two signals and generates a vehicle temperature signal on a line 70 when the interior vehicle temperature is below the cabin temperature setting. For example, a logic high level signal is generated on line 70 when the interior temperature is below the cabin temperature setting.

A control logic unit 72 is arranged to receive the vehicle temperature and steering wheel temperature signals from lines 70 and 66, respectively. Control logic unit 72 generates a heater signal on a line 74 to activate a heater driver 76 when either of these signals indicate below the operator-desired temperatures and the output from timer module 56 is at a logic high level high on line 58. For example, the heater driver 76 is activated when signals on lines 70 and 58 are both at a logic high level, or when signals on lines 66 and 58 are both at logic high level. With heater driver 76 activated, current can flow through the steering wheel heater on line 22, through a heater current limiter 78 and a line 80 through said heater driver 76. The control logic unit 72 does not generate a signal on line 74 to activate heater driver 76 when the vehicle temperature signal indicates that the interior temperature is at or above the cabin temperature setting. Similarly, the control logic unit 72 does not generate a signal on line 74 to activate the heater driver 76 when the steering wheel temperature signal indicates that the steering wheel temperature is at or above the temperature threshold value. Thus, control logic unit prevents the heater driver 76 from being activated when either the cabin temperature or the wheel temperature is at or above their user-defined settings.

To interrupt the flow of current to the steering wheel heater element once either the steering wheel or the interior vehicle temperatures reach their operator selected threshold, the control logic unit 72 issues a timer signal on a line 82. Timer module 56 receives the timer signal and begins a preset timing sequence. When the preset amount of time has elapsed, timer module 56 signals the control logic unit 72 on line 58 to generate a signal to de-activate the heater driver 76. As noted above, control logic unit 72 requires a logic high level signal on line 58 in order to activate heater driver 76. Once the preset amount of time has elapsed, timer module 56 will not provide a logic high level signal on line 58 until timer module 56 has been reset, thus preventing the heater driver 76 from being activated until timer module 56 is reset. Resetting timer module 56 is described hereinafter.

Steering wheel temperature module 60 further generates a current control signal that is provided to heater current limiter 78 via a line 84. The current control signal is proportional to the difference between the temperature of the steering wheel, as provided by steering wheel temperature sensor 20, and the user-input temperature threshold value, which is set on temperature adjustment control 34. The heater current limiter 78 detects the current control signal from module 60 and varies the amount of current flow through the steering wheel heater so that it is proportional to this signal. Thus, the heater current controller 78 is arranged to restrict the current available to the heater driver 76, via line 80, as the steering wheel becomes warmer and the steering wheel heater resistance decreases, and to permit more current flow to the heater driver 76 when the wheel is cold and fast heating is required.

The steering wheel temperature module 60 also generates a reset signal on a line 86 when the operator alters the setting on the temperature adjustment control 34. A detector circuit 88 is arranged to receive the reset signal on line 86 and generate a signal on a line 90 that activates reset circuit 52 to reset timer module 56. In this manner, the timing sequence is recycled whenever the operator changes the desired steering wheel temperature. The operator may also reset the timer 56 by manually operating the on/off/reset switch 36.

On/off/reset switch 36 may be operated by remote control. Remote control receiver 30 is arranged to receive a remote control signal from a remote entry security device (not shown) such as those supplied with many of today's vehicles. Remote control receiver 30 generates a signal on a line 32 to set the on/off/reset switch 36 to the on position.

Portions of modular controller 18 can be activated or de-activated as needed to suit a particular user, or as options on a particular automobile. As described above, steering wheel temperature module 60 allows the user to set a temperature threshold so that the wheel temperature will be comfortable. Similarly, vehicle temperature module 68 allows the temperature of the steering wheel to be determined by the cabin temperature setting. Timer module 56 automatically interrupts the flow of current to the heater should the user forget to do so, and remote control receiver 30 allows the user to initiate heating the steering wheel before she enters the vehicle. These modules can be individually activated or de-activated.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A steering wheel heating system comprising:
   a heating element disposed on a portion of a steering wheel, said heating element arranged to receive an electrical current;
   a sensor disposed on said steering wheel, said sensor providing a first signal indicative of a first temperature on said steering wheel;
   a temperature setting device arranged to provide a second signal indicative of a first user-input temperature setting for said steering wheel, said temperature setting device permitting variable adjustment of said first user-input temperature setting; and
   a controller arranged to receive said first and second signals, said controller for controlling said electrical current such that said electrical current is proportional to a difference between said first user-input temperature setting and said first temperature.

2. The steering wheel heating system of claim 1, wherein said controller includes:
   a sensor arranged to sense an ambient temperature within a passenger cabin of a motor vehicle and provide a third signal indicative of said ambient temperature; and
   a temperature setting device arranged to provide a fourth signal indicative of a second user-input temperature setting, said controller being further arranged to receive said third and fourth signals for controlling said electrical current such that said electrical current is interrupted when said ambient temperature exceeds said second user-input temperature setting.

3. The steering wheel heating system of claim 2, wherein said controller further includes:
   a timer arranged to interrupt said electrical current a predetermined period of time after said ambient temperature increases to said second user-input temperature setting.

4. The steering wheel heating system of claim 1, wherein said controller includes:
   a timer arranged to interrupt said electrical current a predetermined period of time after said first temperature increases to said first user-input temperature setting.

5. The steering wheel heating system of claim 4, wherein said timer is further arranged to reset said predetermined period of time when said first user-input temperature setting is adjusted.

6. The steering wheel system of claim 4, wherein said controller further includes:
   a reset switch arranged to provide a reset signal to said timer, said timer is further arranged to reset said predetermined period of time when said reset signal is received.

7. The steering wheel heating system of claim 1, wherein said controller includes:
   a remote control receiver arranged to receive a remote signal originating external to a motor vehicle and initiate said electrical current upon receipt of said remote signal.

8. A steering wheel heating system comprising:
   a heating element disposed on a portion of a steering wheel, said heating element arranged to receive an electrical current;
   a sensor arranged to sense an ambient temperature within a passenger cabin of a motor vehicle and provide a first signal indicative of said ambient temperature;
   a temperature setting device arranged to provide a second signal indicative of a first user-input temperature setting for said steering wheel, said temperature setting device permitting variable adjustment of said first user-input temperature setting; and
   a controller arranged to receive said first and second signals, said controller for controlling said electrical current such that said electrical current is proportional to a difference between said first user-input temperature setting and said ambient temperature.

9. The steering wheel heating system of claim 8, wherein said controller includes:
   a timer arranged to interrupt said electrical current a predetermined period of time after said ambient temperature increases to said first user-input temperature setting.

10. The steering wheel heating system of claim 9, wherein said controller further includes:
    a reset switch arranged to provide a reset signal to said timer, said timer is further arranged to reset said predetermined period of time when said reset signal is received.

11. The steering wheel heating system of claim 8, wherein said controller includes:
a remote control receiver arranged to receive a remote signal originating external to a motor vehicle and initiate said electrical current upon receipt of said remote signal.

12. A steering wheel heating system comprising:
a heating element disposed on a portion of a steering wheel, said heating element arranged to receive an electrical current;
a temperature setting device for setting a preselected temperature for said steering wheel, said heating element serving to heat said steering wheel to at least said preselected temperature, said temperature setting device comprising an adjustable device so as to permit a user to adjust the preselected temperature; and
a remote control receiver arranged to receive a remote signal originating external to a motor vehicle and initiate electrical current upon receipt of said remote signal.

13. A method of controlling a flow of current to a steering wheel heating element, comprising:
sensing a first temperature on a steering wheel to provide a first signal indicative of said first temperature;
sensing a user-input temperature setting to provide a second signal indicative of said user-input temperature setting for said steering wheel; and
controlling a flow of current to a heating element on said steering wheel such that said electrical current is proportional to a difference between said first user-input temperature setting and said first temperature.

14. The method of claim 13 further comprising:
interrupting said electrical current a predetermined period of time after said first temperature increases to said first user-input temperature setting.

15. The method of claim 14 further comprising:
resetting said predetermined period of time when said user-input temperature setting is adjusted.

16. The method of claim 14 further comprising:
resetting said predetermined period of time when a reset switch is activated.

17. A method of controlling a flow of current to a steering wheel heating element, comprising:
sensing an ambient temperature within a passenger cabin of a motor vehicle to provide a first signal indicative of said ambient temperature;
sensing a user-input temperature setting to provide a second signal indicative of said user-input temperature setting for said steering wheel; and
controlling a flow of current to a heating element on said steering wheel such that said electrical current is proportional to a difference between said first user-input temperature setting and said ambient temperature.

18. The method of claim 17 further comprising:
interrupting said electrical current a predetermined period of time after said ambient temperature increases to said user-input temperature setting.

19. The method of claim 18 further comprising:
resetting said predetermined period of time when a reset switch is activated.

20. The steering wheel heating system of claim 1, wherein said controller includes a temperature adjustment control which communicates with a steering wheel temperature module for permitting the user to adjust said first user-input temperature setting, wherein said steering wheel temperature module compares said first and second signals and generates a first control signal when said first temperature is below said first user-input temperature setting, said first control signal being communicated with said heating element and directs the heating of said heating element.

21. A steering wheel heating system comprising:
a heating element disposed on a portion of a steering wheel, said heating element arranged to receive an electrical current for heating of said steering wheel;
a first sensor disposed on said steering wheel for generating a first signal which represents a temperature of said steering wheel;
a second sensor for placement in a passenger cabin of a vehicle for generating a second signal representative of ambient temperature within said passenger cabin;
a temperature setting device in which first and second temperature settings are inputted by a user, said first temperature setting being a desired steering wheel temperature, said second temperature setting being a desired ambient cabin temperature, said first temperature setting being represented by a third signal and said second temperature setting being represented by a fourth signal;
a first module control unit for receiving said first and third signals, said first module control unit generating a first control signal when said steering wheel temperature is less than said first temperature setting;
a second module control unit for receiving said second and fourth signals, said second module control unit generating a second control signal when said ambient temperature is less than said second temperature setting; and
a module controller for receiving said first and second control signals and for generating a heater signal which permits electrical current to flow to said heater element for heating thereof, said heater signal being generated when said module controller receives at least one of said first and second control signals.

* * * * *